Aug. 16, 1938. W. T. WELLS Re. 20,832
WELL HEATING DEVICE AND METHOD
Original Filed Feb. 15, 1936
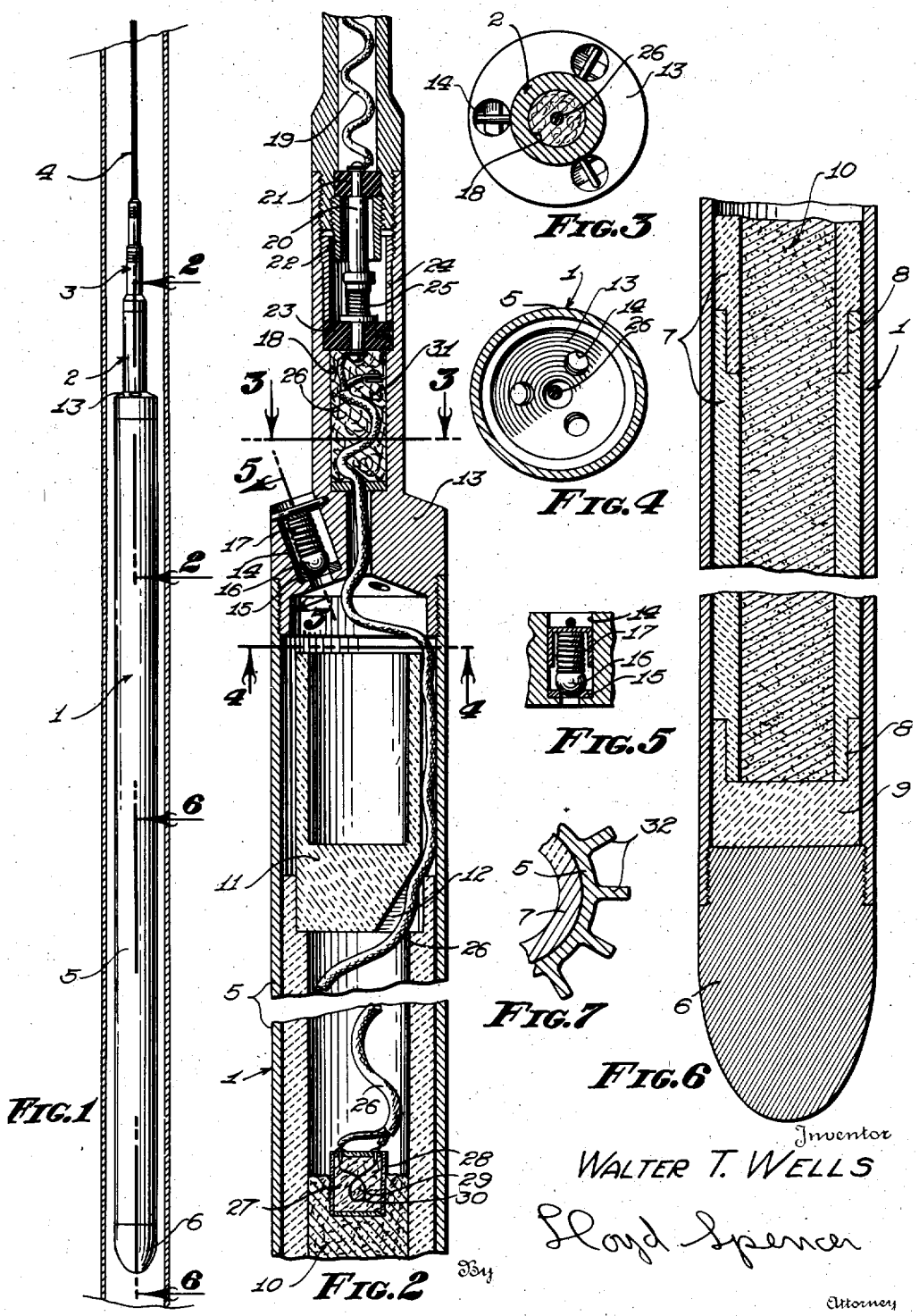
Inventor
WALTER T. WELLS
Lloyd Spencer
By
Attorney Reissued Aug. 16, 1938 Re. 20,832

UNITED STATES PATENT OFFICE 20,832

WELL HEATING DEVICE AND METHOD

Walter T. Wells, Glendale, Calif., assignor, by mesne assignments, to Lane-Wells Company, Los Angeles, Calif., a corporation of Delaware Original No. 2,076,308, dated April 6, 1937, Serial No. 64,007, February 15, 1936. Application for reissue June 18, 1938, Serial No. 214,587

14 Claims. (Cl. 166—17)

My invention relates to well heating devices and methods, and among the objects of my invention are:

First, to provide a well heating device which utilizes thermite as a heating medium.

Second, to provide a heating device of this character which is particularly adapted to melt paraffin or other low melting solid accumulations in and around the perforations of a well liner or within the casing above the liner, as well as generally heating and thereby decreasing the viscosity of the well fluid.

Third, to provide a heating device adapted to be suspended from a cable so that it can be lowered and raised quickly.

Fourth, to provide a heating device which generates a substantial quantity of heat within a short time.

Fifth, to provide a heating device for wells which serves to prepare a well for reproduction after idle periods.

Sixth, to provide a heating device which is self-contained, efficient in its operation, and both simple and economical of manufacture.

Seventh, to provide, on the whole, a novel method of heating wells.

With the foregoing and other objects in view, as may hereinafter appear, attention is directed to the accompanying drawing, in which:

Figure 1 is an elevational view of my well heating device shown suspended from a cable within a cased well bore.

Figure 2 is an enlarged fragmentary sectional view of the heating device taken through 2—2 of Figure 1 showing the upper portion of the heating chamber and the means of connection with the cable head.

Figure 3 is a transverse sectional view through 3—3 of Figure 2 looking downwardly on the relief valve deck.

Figure 4 is another transverse sectional view through 4—4 of Figure 2 looking upwardly at the valve deck.

Figure 5 is a fragmentary sectional view through 5—5 of Figure 2 along the axis of one of the relief valves.

Figure 6 is a fragmentary, longitudinal, sectional view of the lower portion of the heating device taken through 6—6 of Figure 1.

Figure 7 is a modified form of the heating device in which heat radiating fins are incorporated.

My well heating device comprises generally a heating chamber 1 adapted to receive thermite or analogous material, a connecting member 2, a cable head 3, and cable 4.

The heating chamber includes a length of tubing forming a shell 5 which is internally threaded at its lower end to receive a plug 6. The shell 5 is provided with a lining of refractory material, preferably in the form of tubular sections 7 shaped at their ends to form telescoping portions 8. The bottom lining section fits into a cup-shaped end member 9 also formed of refractory material. By substituting shells 5 of different lengths and adding lining sections 7, a receptacle of any desired length is formed.

This receptacle is filled with thermite 10 or analogous material having a high exothermic reaction and generating a minimum amount of gaseous products. The lining 7 preferably extends well above the level of the thermite to prevent material from coming in contact with the upper portion of the shell.

The upper extremity of the lining 7 receives a relatively deep socket member 11 of refractory material which is positioned with its open end up. The socket member is provided with channels 12 in its lower end and is spaced from the walls of the shell 5 to provide free passage for any gases that may be generated or expanded by reason of the heat created.

The upper end of the shell 5 is internally threaded to receive the enlarged lower end of the connecting member 2. Said connecting member decreases in diameter above the shell forming a valve deck 13. The valve deck is provided with passages 14 therethrough which receive valve seat members 15 engaged by ball valves 16. The ball valves seal against external pressure and are urged against their seats by springs 17. The socket member is made large enough to catch any drippings from the valves 16 to prevent such moisture from falling upon the thermite.

The connecting member 2 is provided with a central bore 18 therethrough which is constricted at its lower portion. The upper or larger portion of the bore 18 is internally threaded at its upper end to receive the lower end of the cable head 3 which is, in turn, secured to the cable 4.

The cable 4 is a special type of wire rope having sufficient strength to support the well heater and provided with a central conductor core 19.

The conductor core extends to the lower end of the cable head where it is attached to a terminal 20 supported by an insulating disk 21, as shown in Figure 2. The disk 21 is held in place by a threaded, hollow nipple 22 and the terminal projects therethrough.

The connecting member 2 likewise receives an insulating disk 23 which is held in place by a hollow nipple 24. The insulating disk 23 carries a yieldable terminal member 25 engageable with the terminal 20 when the connecting member and cable head are screwed together.

A double lead conductor 26 is attached by one lead to the terminal below the disk 23 and is grounded by its other lead to the connecting member. The conductor extends through the bore 18 of the connecting member around the socket member 11 and into the lining 7. The lower extremities of the conductor are connected to an igniting cartridge 27 of any suitable design and are embedded in the thermite. Said cartridge may comprise a shell 28 of inflammable insulating material containing the igniting mixture 29 commonly used for thermite, and having embedded therein a wire 30 adapted to be heated to incandescence when current is passed therethrough.

In order to minimize conduction of heat to the cable head, the bore 18 of the connecting member may be packed with asbestos or other heat insulating material 31.

Operation of my well heating device is as follows:

When electrical energy is supplied to the igniting cartridge, the thermite is ignited thereby and burns. The heat generated by the thermite is transferred to the surrounding well fluid, raising it to a temperature sufficient to melt paraffin deposits along the sides of the casing, or the perforated liner through which the well fluid enters from the formation. The heating device is raised or lowered as the thermite burns to distribute the heat where desired.

The purpose of the lining 7 is to prevent damage to the shell 5 but, particularly in the heaters of smaller diameter, the liners may be omitted to increase the available area. In such case, of course, the shell 5 is renewed each time.

Dissipation of heat from the heater may be increased by providing heat radiating fins 32, as shown in Figure 7.

The check valves serves to permit escape of any gases that may be generated, and the socket member not only traps any water that may leak in, but also serves to protect the lower end of the connecting member 2 from the direct heat of the thermite.

Though I have shown and described a particular embodiment of my invention, I do not wish to be limited thereto, but desire to include in the scope of my invention the constructions, combinations, and arrangements embraced in the appended claims.

I claim:

1. A well heating device comprising: a container; a non-explosive exothermic reacting substance therein; and means for igniting said substance.

2. In a well device: a non-explosive exothermic reacting substance adapted, when ignited, to produce a metal in the molten state; and means for igniting said substance while suspended within a well bore.

3. The combination with a weight supporting and conducting cable: of a container suspended from said cable; a quantity of non-explosive exothermic substance within said container; and an electrically responsive igniting cartridge electrically associated with said cable and positioned to ignite said substance.

4. In a well heating device: a supporting and conducting cable; a container suspended therefrom; a quantity of non-explosive exothermic substance within said container and sealed thereby from the surrounding well fluid; and an electrically responsive igniting cartridge electrically connected with said cable and positioned within said container.

5. A well heating device comprising: a container; a non-explosive exothermic reacting substance therein; means for igniting said substance; and check valves incorporated in said chamber for relieving excess pressure therein.

6. In a well heating device: a supporting and conducting cable; a container suspended therefrom; a quantity of non-explosive exothermic substance within said container and sealed thereby from the surrounding well fluid; an electrically responsive igniting cartridge electrically connected with said cable and positioned within said container; and check valves incorporated in said chamber for relieving excess pressure therein.

7. A well heating device comprising: a container; a non-explosive exothermic reacting substance therein; means for igniting said substance; and a lining of refractory material within said container.

8. In a well heating device: a supporting and conducting cable; a container suspended therefrom; a quantity of non-explosive exothermic substance within said container and sealed thereby from the surrounding well fluid; an electrically responsive igniting cartridge electrically connected with said cable and positioned within said container; and a lining of refractory material within said container.

9. A well heating device comprising: a container; a non-explosive exothermic reacting substance therein; means for igniting said substance; check valves incorporated in said chamber for relieving excess pressure therein; and trap means associated with said check valves for entrapping fluids leaking therethrough.

10. In a well heating device: a supporting and conducting cable; a container suspended therefrom; a quantity of non-explosive exothermic substance within said container and sealed thereby from the surrounding well fluid; an electrically responsive igniting cartridge electrically connected with said cable and positioned within said container; check valves incorporated in said chamber for relieving excess pressure therein; and trap means associated with said check valves for entrapping fluids leaking therethrough.

11. A method of treating wells characterized by: introducing a non-explosive exothermic substance opposite the region to be treated and then igniting said substance and collecting and retaining the residue for withdrawal.

12. A method of treating wells characterized by: introducing a quantity of thermite opposite the region to be treated; and then igniting the thermite electrically and collecting and retaining the residue for withdrawal.

13. A method of heating a well bore characterized by: introducing a quantity of exothermic material into a well bore; maintaining such material isolated from but heat-conductibly associated with the well fluids; igniting said material, causing it to undergo its exothermic reaction; then moving said material along the well bore as it undergoes its reaction.

14. A method of heating a well bore characterized by: introducing a quantity of thermite into a well bore while maintaining the same isolated from but heat-conductibly associated with the well fluids; igniting the thermite; then moving the thermite along the well bore as it undergoes its reaction.

WALTER T. WELLS.